R. WILLIAMS.
PROCESS OF MAKING SUPERPHOSPHATE.
APPLICATION FILED JULY 29, 1908.
1,003,681.
Patented Sept. 19, 1911.
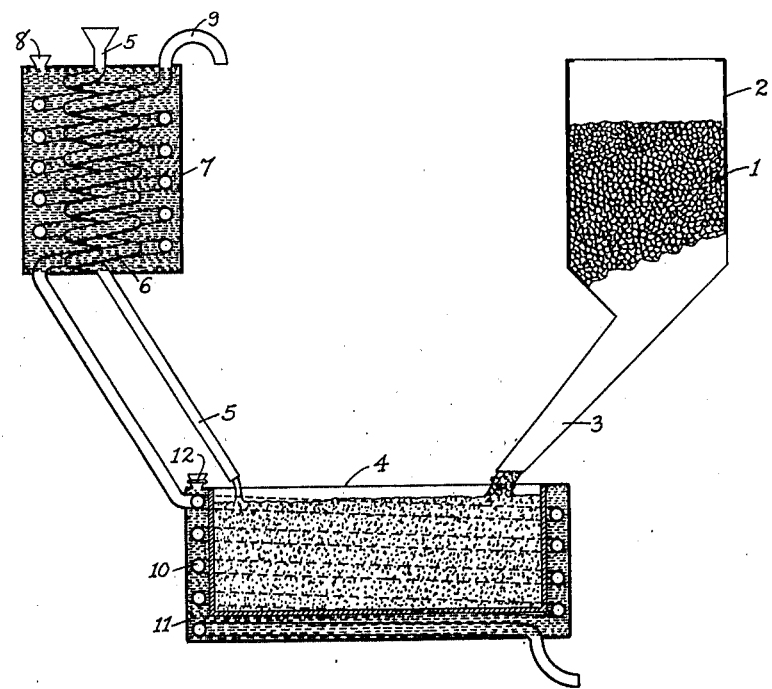
Inventor
Rinaldo Williams
Witnesses
By
Attorney

UNITED STATES PATENT OFFICE.

RINALDO WILLIAMS, OF BIRMINGHAM, ALABAMA.

PROCESS OF MAKING SUPERPHOSPHATE.

1,003,681.  Specification of Letters Patent.  Patented Sept. 19, 1911.

Application filed July 29, 1908. Serial No. 445,885.

*To all whom it may concern:*

Be it known that I, RINALDO WILLIAMS, a citizen of the United States, residing at Birmingham, in the county of Jefferson and State of Alabama, have invented new and useful Improvements in Processes of Making Superphosphate, of which the following is a specification.

My invention relates to an improved process for the manufacture of superphosphate or acid phosphate, particularly where phosphate rock containing a relatively large percentage of impurities, such as oxid of iron, alumina, etc., is treated with sulfuric acid to form available phosphoric acid in the form of $CaO2H_2OP_2O_5$ or $2CaOH_2OP_2O_5$.

According to old practice the crushed phosphate rock and an approximately equal quantity by weight of sulfuric acid are introduced into a pan where the usual reaction takes place, the mixture and the pan both becoming highly heated to 212° Far. and over. In this practice, there is added to the ground rock, an amount of acid considerably in excess of that required to convert simply the insoluble phosphate of lime or tri-calcic phosphate into the soluble or available phosphoric acid, or soluble phosphate of lime, this excess being made necessary by the combination of a certain proportion of the acid with the impurities in the rock. As these impurities will not be converted into available phosphoric acid, they remain a neutral element in the resultant acid phosphate which lowers its percentage of available phosphoric acid and increases its transportation charges per unit of available phosphoric acid which constitutes the basis of sale.

Obviously, a considerable advantage will be gained if the action of the sulfuric acid on the impurities in the phosphate rock can be avoided, as less sulfuric acid will be added to the mixture, thereby giving a higher percentage of phosphoric acid per unit of weight in the resulting acid phosphate.

I have found that sulfuric acid will not act on the impurities in the phosphate rock, or at the most will act but little where the reaction between the acid and phosphate takes place at a low temperature. In other words, when the sulfuric acid and crushed phosphate rock are mixed in the pan or retort if the mixture and, if necessary, the pan itself be kept cool or below 100° F., the sulfuric acid will act only on the tri-calcic phosphate in the rock, converting the latter almost entirely into available phosphoric acid in an acid phosphate mixture which will contain in addition to said acid phosphate only the quantity of impurities originally in the phosphate rock, the same constituting practically a fixed element.

Referring to the accompanying sheet of drawing in which I illustrate one form of apparatus adapted for carrying out my improved process, the phosphate rock 1, preferably ground to dust which will pass through from 60 to 200 mesh screen, is fed downwardly from the hopper 2 through a spout 3 into the mixing pan 4. The sulfuric acid enters the pan through a pipe 5 which has interposed in it a coil 6 disposed in a brine tank 7, the upper end of the pipe 5 extending beyond the tank 7 and being supplied with sulfuric acid in any suitable manner. Brine is introduced in the tank 7 through an opening 8 and is maintained at a low or refrigerating temperature by an ammonia coil 9, which leads downwardly from the tank 7 and continues as a coil 10 disposed in a brine tank 11 which surrounds the pan 4. I prefer to maintain the temperature as low as 100° F. and I consider that the benefits of my process will be increased to an extent as the temperature is lowered further as much as is commercially practicable. This tank is preferably formed as a space between the inner and outer walls of the pan and has a port 12 for the supply of brine, the pipe 9 passing out from the tank 11 and continuing to any suitable refrigerating apparatus. The ammonia coil will act upon the brine in the tanks 7 and 11 to refrigerate the sulfuric acid before it enters the pan and also to chill or refrigerate the mixture in the pan, thereby maintaining the mixture at a low temperature as above indicated, for the purposes and with the benefits herein described.

According to the old practice, the quantity of impurities in the rock is practically twice as much in the resulting mixture, as in raw phosphate rock, due to the above described action of the sulfuric acid on the impurities in the rock. For example, in tests which I have conducted where 1000 lbs. of phosphate rock were mixed with 1100 lbs. of sulfuric acid of 50° Baumé and treated according to the old process, the resulting acid phosphate in the form of a wet and sticky mass contained 15.03% available phosphoric acid.

In the tests conducted according the old practice I found that the temperature of the reacting mixture rose approximately to the boiling point of water or 212° Far. In the tests which I conducted according to my improved process, the temperature of the reacting mixture was artificially lowered to about 100° Far. The extent to which the temperature should be artificially lowered, according to my process, varies with the different conditions of practice and I do not therefore limit myself to any definite degree of lowering, provided the same constitutes a substantial lowering of the temperature below that normally reached by a reacting mixture according to present practice. A similar quantity of the same rock treated by my process at a temperature of about 100° F. and to which only 900 lbs. of sulfuric acid of 50° Baumé were added, gave 17.23% available phosphoric acid in the resulting acid phosphate. I find from a number of tests that, where a low grade phosphate rock containing a relatively high percentage of oxid of iron and alumina is treated by the old process, the conversion of the tri-calcic phosphate in the rock is not complete, frequently leaving as high as 2 and 3% of phosphoric acid in insoluble form in the resultant mixture, whereas when the treatment is in accordance with my process, this loss is practically eliminated, the insoluble phosphoric acid being almost entirely converted into available phosphoric acid, the percentage of insoluble phosphoric acid remaining, being less than one-half of one per cent.

From the foregoing it will be seen that my process gives marked economy both in the quantity of sulfuric acid required for treating a given quantity of phosphate rock and also in the higher percentage of available phosphoric acid per unit of resulting acid phosphate.

The mixture may be kept cool and at the desired low temperature during reaction in any suitable manner, such as by cooling the pan with a forced circulation of air, water, or, as illustrated, with a refrigerating fluid, and by similar means the sulfuric acid and the phosphate rock, either or both, may be as low as 32° F. if desired chilled before introduction into the pan. By artificially lowering the temperature of the reacting mixture, I mean to cover any means for causing the reaction to take place at a temperature which is materially lower than it would be but for such artificial treatment, and this may be accomplished as above stated by the use of a cooling medium artificially applied to the mixture or by chilling its component elements.

Having thus described my invention, what I claim as new and desire to secure by Letters Patent, is:—

1. The improved process for the manufacture of superphosphate which consists in treating ground phosphate rock with sulfuric acid in the customary manner to form a wet mixture, and artificially lowering the temperature of the reacting mixture of acid and phosphate rock.

2. The improved process for the manufacture of superphosphate which consists in adding to the phosphate rock only sufficient sulfuric acid to convert the tri-calcic phosphate therein into soluble phosphate of lime and artificially lowering the temperature of the reacting mixture of acid and phosphate rock, substantially as described.

3. The improved process for the manufacture of superphosphate which consists in mixing with the phosphate rock a quantity of sulfuric acid, which has been artificially chilled to lower its temperature to an abnormal degree, sufficient only to convert the insoluble phosphoric acid therein, thereby leaving the impurities in the phosphate rock unacted on, and maintaining the mixture during the period of its reaction at a low temperature.

In testimony whereof I have hereunto set my hand in presence of two subscribing witnesses.

RINALDO WILLIAMS.

Witnesses:
  NOMIE WELSH,
  ANNIE L. PEACE.